United States Patent [19]

Henningsson et al.

[11] Patent Number: 4,761,913

[45] Date of Patent: Aug. 9, 1988

[54] GREENHOUSE SCREEN

[75] Inventors: Göran Henningsson, Kinna; Olof Hellgren, Lund, both of Sweden

[73] Assignee: Ludvig Svensson International BV, Hellevoetsluis, Netherlands

[21] Appl. No.: 102,570

[22] Filed: Sep. 29, 1987

Related U.S. Application Data

[63] Continuation-in-part of Ser. No. 863,375, filed as PCT SE85/00301 on Aug. 5, 1985, published as WO86/01072 on Feb. 27, 1986.

[30] Foreign Application Priority Data

Aug. 6, 1984 [SE] Sweden ................................. 8403986

[51] Int. Cl.⁴ .............................................. A01G 9/22
[52] U.S. Cl. ............................................. 47/17; 66/192;
66/202; 139/420 R; 139/420 A; 350/1.7;
428/226; 428/229; 428/912.2; 428/913;
523/135
[58] Field of Search ............... 47/17; 66/192, 202;
139/420 A, 420 R; 160/66, 84 R; 350/1.7;
428/226, 229, 912.2, 913; 523/135

[56] References Cited

U.S. PATENT DOCUMENTS

| | | | |
|---|---|---|---|
| 3,043,709 | 7/1962 | Amborski | 47/17 |
| 3,542,710 | 11/1970 | Glatti | 47/17 |
| 3,857,804 | 12/1974 | Glatti et al. | 428/220 |
| 4,134,875 | 1/1979 | Tapia | 47/17 |
| 4,235,043 | 11/1980 | Harasawa et al. | 47/17 |
| 4,270,308 | 6/1981 | Mitsuishi et al. | 47/17 |
| 4,423,164 | 12/1983 | Bar | 47/17 |
| 4,508,776 | 4/1985 | Smith | 428/285 |
| 4,632,863 | 12/1986 | Henningsson | 428/229 |

FOREIGN PATENT DOCUMENTS

| | | |
|---|---|---|
| 892561 | 9/1982 | Belgium . |
| 109951 | 5/1984 | European Pat. Off. . |
| 2107346 | 11/1971 | Fed. Rep. of Germany . |
| 79346 | 1/1971 | German Democratic Rep. . |
| 8012 | 12/1980 | Japan . |
| 43574 | 9/1982 | Japan . |
| 209304 | 8/1982 | United Kingdom . |

*Primary Examiner*—James C. Cannon
*Attorney, Agent, or Firm*—Cushman, Darby & Cushman

[57] ABSTRACT

Greenhouse screen for use as a filter for short-day treatment of plants and made of a film, textile, non-woven material or a combination thereof with high light resistance and good weathering conditions. The greenhouse screen at least partly consists of a material which in one or more layers has high absorption of light in a significant part of the wavelength interval 575–800 nm and with substantially total absorption in the wavelength interval 600–750 nm and which has high transmittance of light in the wavelength interval 400–575 nm.

5 Claims, 1 Drawing Sheet

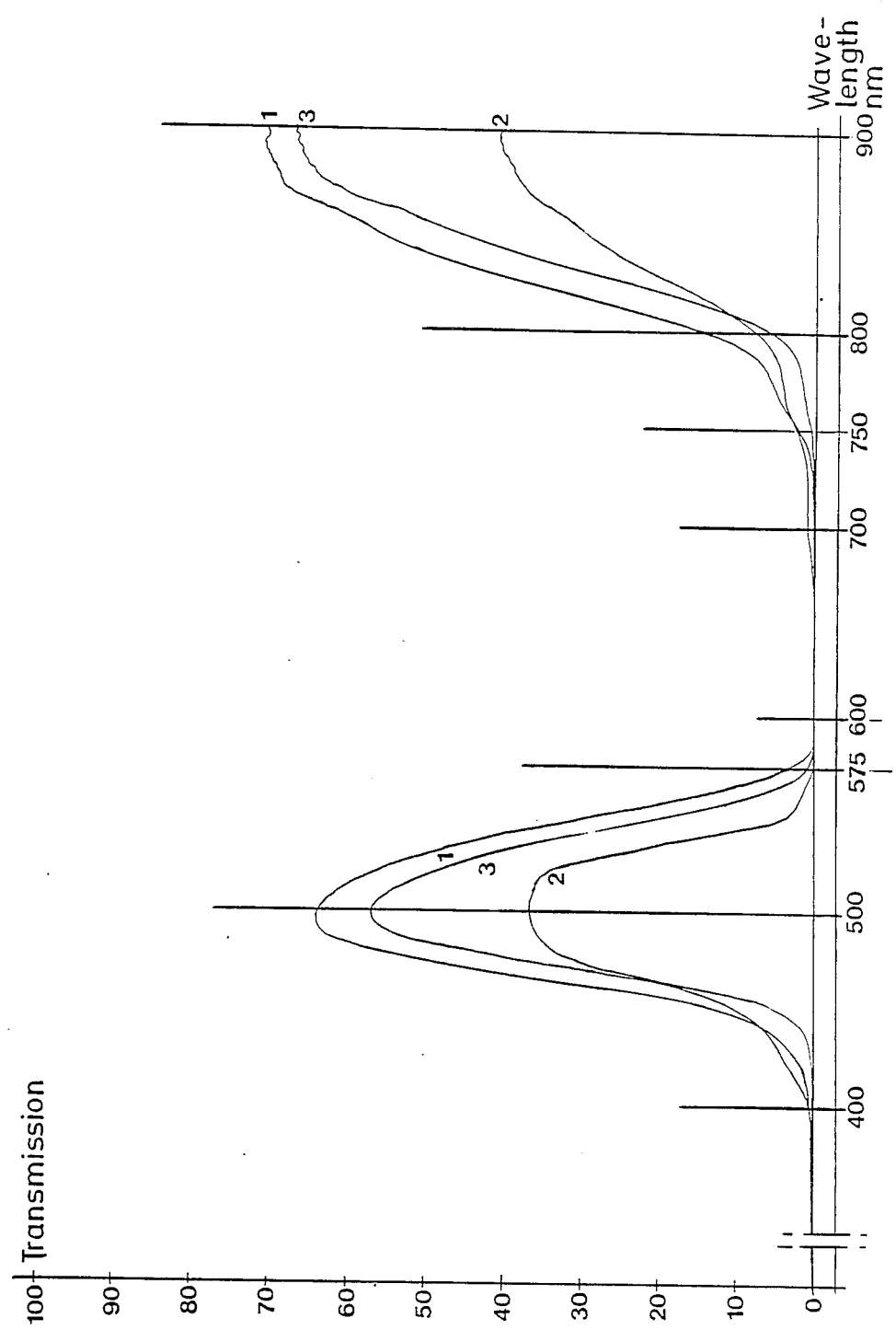

GREENHOUSE SCREEN 863,375, filed as PCT SE85/00301 on Aug. 5, 1985, published as WO86/01072 on Feb. 27, 1986, and now abandoned.

The present invention refers to a greenhouse screen for use as a filter for short-day treatment of plants and made of a film, textile or non-woven material with high light resistance and good weathering characteristics.

BACKGROUND OF THE INVENTION

Successful growth in greenhouses is strongly dependent on an appropriate amount of light penetration to the plants so that the photosynthesis generates the desired development of the plants. During recent years shadow curtains have been used, the primary purpose of which is to prevent undesirable sunshine so that the plants do not overheat. Of all sunshine about 45% is visible light, that is photosynthetic light, while the remainder, about 55%, only gives heat. An ideal shadow curtain should reduce the photosynthetic light minimally and reflect all other light maximally.

The plant's requirements for photosynthetic light vary considerably from one type of plant to another and certain plants are so called short day plants which require short days to bloom quickly. If the natural day is not sufficiently short the plant must be fooled, which is achieved with blackout curtains which completely shut out the light. However blackout can cause the plant to stretch itself in an undesirable way or cause blooming to be delayed. One disadvantage with the shadow curtain is that it blacks out the greenhouse to such an extent that at the same time it is impossible to work inside. The blackout curtain can also have the characteristics of an energy curtain, that is, it should reduce the flow of heat to the cold greenhouse and thereby reduce water evaporation from the earth and plants and it should reflect heat radiation from the heating pipes, plants, earth, etc. in the greenhouse.

As different plants are variously sensitive to light and temperature very stringent requirements are placed on the growers' experience and knowhow that the correct steps are taken at the right time.

SUMMARY OF THE INVENTION

The purpose of the present invention is to achieve a greenhouse screen which combines the characteristics which a shadow curtain and a blackout curtain and in certain cases also an energy curtain have. As a shadow curtain it should exclude undesired sunshine, that is, the sunshine that the plants cannot use in photosynthesis. The blackout curtain should simulate short daylight hours so that the plant can develop in the desired manner, and the energy curtain should reduce heat convection and energy costs through its ability to reflect light, and have a high absorption capability in order to prevent water condensation. These objects have been achieved by a greenhouse screen which at least partly consists of a material which in one or more layers has high absorption of light in a significant part of the wavelength interval 575-800 nm, and with a substantially total absorption in the wavelength interval 600-750 nm, and which has a high transmittance of light in the wavelength interval 400-575 nm.

By making greenhouse screens with larger or smaller portions of said sunshine absorbing and/or reflecting material and through addition of material with other functions greenhouse curtains can be made with widely varying characteristics.

BRIEF DESCRIPTION OF THE DRAWINGS

FIG. 1 shows graphs of the transmission percentage with varying wavelength of the incident radiation for some materials which may be used for the greenhouse screen according to the invention.

DETAILED DESCRIPTION OF THE PREFARRED EMBODIMENTS

The greenhouse screen according to the invention is appropriately made of a film material which absorbs light in a significant part of the wavelength interval 575-800 nm, while the photosynthetic light of the sunshine of the wavelength interval 400-575 nm is mainly transmitted through the material. The film material is incorporated in the greenhouse screen in the form of narrow strips which can be connected in a variety of different ways, for example through a knitting procedure where the film strips are fixed relative to each other by a thinly knitted yarn skeleton. The pillar stitches between the film strips should then be as small as possible so that the relative surface of the strips is as large as possible. Instead of a knitting procedure the strips can be connected by waving whereby the warp can consist of the film strips while the wefts are appropriately made of very thin threads of a synthetic textile material. It is also possible that the wefts consist of film strips, in which embodiment two strips on top of each other have the desired light absorption in the given wavelength interval 575-800 nm.

The absorption curve of the film strip material does not necessary have to be constant, but the absorption should be substantially total in the wavelength interval 600-750 nm, from which interval the absorption can decrease successively. With the expression "a substantially total absorption" is intended on absorption of 95% or more.

In order to achieve different effects a larger or smaller amount of other material strips with specific functions can be incorporated in the greenhouse screen. Depending on for which plants the fabric is to be used, a certain percentage of the curtain's total area can consist of strips of highly reflective, low emitting film material such as aluminium foil, which then also functions as a blackout curtain, in addition to the sunshine absorbing material strips. It is even possible that a certain amount of white film strips be included in the curtain in order to achieve a certain shadow effect. The highly reflecting, low emitting aluminium strips can be provided with a heat radiation absorbing layer on their undersides, that is the sides facing toward the plants. The width of the strips can also be adjusted according to requirements and needs, such as ease in hanging, and can very from a few millimeters to several centimeters. From experience one knows which plants are very sensitive to light and which ones are more robust. Such experience is used in making the greenhouse screens so that the grower has access to different types of curtains and can adjust the light screening to both the type of plant and its needs and to the season and weather.

We claim:

1. Greenhouse screen, for use as a filter for short-day treatment of plants and made of a film, textile, non-woven material or a combination thereof with high light resistance and good weathering characteristics wherein: said greenhouse screen at least partly consists of a material which in one or more layers has high absorption of light in a significant part of the wavelength interval 575–800 nm, and with a substantially total absorption in the interval 600–750 nm, and which has a high transmittance of light in the wavelength interval 400–575 nm.

2. Greenhouse screen according to claim 1, wherein said material is in the form of narrow strips connected to each other, providing a fabric by a weaving or knitting technique.

3. Greenhouse screen according to claim 2, wherein in addition said sunshine absorbing material, one of highly reflecting, low emittance film material and strip of white film is included in a backing for the material.

4. Greenhouse screen made by weaving according to claim 2, wherein there is a weave warp including said material strips, and a weft including one of thin threads of synthetic textile material, thin threads of the same material as the warp, and thin threads of white film strips.

5. Greenhouse screen according to claim 4, wherein the highly reflecting film material is limited to one side, while the other side is a heat radiation absorbing layer.

* * * * *